United States Patent Office 2,881,874
Patented Apr. 14, 1959

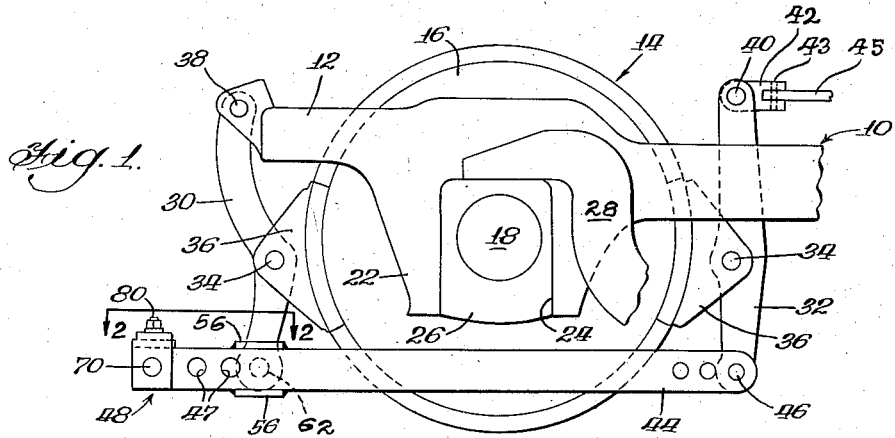

2,881,874

ADJUSTABLE CONNECTOR

Walter R. Polanin, Chicago, Ill., assignor to American Steel Foundries, Chicago, Ill., a corporation of New Jersey Application July 24, 1956, Serial No. 599,793

4 Claims. (Cl. 188—197)

This invention relates to brake rigging for railway car trucks and more particularly to a manually operated adjustable connector employed therein.

The invention comprehends a manually operated device for pivotally interconnecting related elements of a brake rigging whereby the positions of the interconnected elements, relative to each other, can be varied to eliminate slack in the linkage.

Although numerous slack adjusting devices have been employed to adjustably interconnect related elements of a brake rigging, most of these devices involve cumbersome or complex structures, which are expensive to produce and maintain and which require more space than is generally available in many of the modern railway car truck arrangements. Also, many of the conventional slack adjusting devices have outwardly protruding bolts and pins which interfere with other elements of the truck structure.

It is therefore an important object of this invention to provide an improved, manually operated, adjustable connector that is simple in design, construction and operation.

Another object of the invention is to provide an adjustable connecting device having a relatively few number of parts and which may be readily assembled and disassembled.

Another object of the invention is the provision of an adjustable connecting device requiring a minimum amount of space and being free of outwardly extending pins, bolts, nuts and other obstructions.

A more specific object of the invention is the provision of a manually operated, adjustable connecting device comprising a frame pivotally connectable to related elements of a brake rigging and having means to selectively vary the positions of the elements relative to each other.

These and other objects of the invention will become apparent from an examination of the following description and drawings, wherein:

Figure 1 is a fragmentary side elevational view of a portion of a railway car truck illustrating the application of the novel connecting device to the brake rigging;

Figure 2 is a sectional view taken along the line 2—2 of Figure 1;

Figure 3 is a fragmentary side elevational view of the structure illustrated in Figure 2, and Figure 4 is a fragmentary end elevational view of the structure illustrated in Figure 2.

It will be understood that certain elements have been intentionally omitted from certain views where they are more clearly illustrated in other views.

Referring now to the drawings for a better understanding of the invention and particularly to Figure 1 of the drawings, it will be seen that the device is shown as applied to the brake rigging of a railway car truck, having a frame 10 supported on a pair of spaced wheel and axle assemblies 14 (only one of which is shown).

Each assembly 14 comprises a pair of wheels 16 (only one of which is shown) mounted on an axle 18.

The truck frame 10 comprises a pair of wheel pieces or side members 12 (only one of which is shown) having, adjacent the ends thereof, a pair of depending pedestal jaws 22 defining therebetween a journal opening 24 in which may be mounted, in any desired manner, a journal box 26 receiving the ends of axle 18. The truck frame may also include a pair of equalizer bars 28 (only one of which is shown) having their respective opposite ends seated on the journal boxes 26 associated with the respective assemblies.

The portion of the brake rigging illustrated in the drawing comprises a pair of outer and inner brake levers 30 and 32, respectively, pivotally connected intermediate their respective ends by pins 34 to respective brake shoe assemblies 36 which are disposed on opposite sides of and engageable with wheel 16. Outer brake lever 30 is a dead lever having its upper end fulcrumed to the truck frame by pin 38, while inner brake lever 32 is a live lever having its upper end pivotally connected by pin 40 to a link 42 which in turn is connected by pin 43 to a lever 45 actuated by a power source (not shown). The outer and inner levers 30 and 32, respectively, are interconnected at their lower ends by a pair of straps 44 spaced from each other and disposed on opposite sides of wheel 16. The inner ends of the straps may be pivotally connected by pin 46 to the lower extremity of inner brake lever 32, while the outer ends of the straps 44 may be provided with a plurality of longitudinally spaced pairs of aligned pin holes 47 and adjustably connected to the lower extremity of the outer brake lever 30 by means of the connector device indicated generally at 48.

As best seen in Figures 2, 3 and 4 of the drawings, connector 48 includes a frame 50 having a pair of longitudinally extending transversely spaced guide bars 52 interconnected adjacent certain corresponding ends thereof by a transversely extending bridge 54. The bars 52 are each provided with a pair of outboardly extending vertically spaced guide flanges or jaws 56 rigidly secured thereto as by welds 57. The respective pairs of jaws are preferably disposed at the end of the frame remote from the bridge and define therebetween strap guide slots 58 open at the outer sides of the frame.

As best seen in Figure 2, the lower extremity of the outer brake lever 30 is provided with a trunnion 59 having an aperture 60 extending therethrough. The lever 30 may be pivotally connected to the adjuster frame, adjacent the end of the frame remote from the bridge, by means of a preferably headless pin 62 extending through trunnion aperture 60 and having its ends received in aligned apertures 64 of the respective guide bars 52.

As best seen in Figure 4, a yoke 65 is mounted on the frame 50 and rigidly secured to the bridge 54 in any desired manner, as by welds 66. The yoke 65 preferably comprises a generally flat transversely extending horizontal element 67 seated on the bridge 54 and having at its outer ends preferably integral depending flat vertical arms 68 which are spaced outwardly from the respective frame guide bars 52 to define therebetween additional strap guide slots 69 open at the lower side of the frame.

The frame 50 is disposed between the straps 44 with the outer ends of the straps disposed outwardly adjacent the respective guide bars 52 and received in guide slots 58 defined by the respective pairs of jaws 56 and guide slots 69 defined by the yoke 65. The outer ends of the straps 44 are connected to the frame 50 adjacent the bridge end of the frame by a pair of pins 70 each extending through aligned pin holes 72, 47 and 73 of the frame arms, straps and yoke, respectively.

As best seen in Figure 4, the pins 70 have heads 74, disposed on the inner sides of the frame. The pins 70 may be prevented from accidental displacement by means of a generally horizontal transversely extending retaining plate 76 mounted under the bridge 54 and having depending end flanges 78 adjacent the heads 74 of the respective pins.

The retaining plate may be attached to the underside of the bridge 54 by means of a bolt and nut assembly 80 extending through aligned apertures of the plate bridge and yoke, and preferably rigidly secured to the underside of the 54, as by welds 82.

To assemble the device, the lower extremity of outer lever 30 is inserted between the guide bars 52 of the frame and pin 62 is inserted into aligned apertures 60 and 64 of the ever and guide bars, respectively. The straps 44 are then inserted through guide slots 58 and 69 and are moved forward until the guide bar holes 72 are aligned with the desired pairs of strap pin holes 47 to afford the proper position of the outer brake lever 30 relative to the straps 44. At this point, the pins 70 are inserted from inside the frame through the aligned pin holes of the guide bars, straps, and yoke arms. The retaining plate is then placed in position under the bridge and secured to the bridge and yoke by bolt and nut assembly 80.

To describe the operation of the device, it will be understood that when the normal wear of the parts causes undesired slack in the linkage, such slack can be taken up by removing the nut and bolt assembly 80 and the retaining plate 76, withdrawing the pins 70, moving the straps 44 to the next set of holes 47, reinserting the pins 70, and replacing the guide plate in the manner above described.

Thus, it will be seen that I have provided a manually operated adjustable connecting device of extremely simple construction and operation and which serves to inter connect related brake rigging elements whereby the positions of the elements relative to each other can be readily adjusted.

I claim:

1. In a linkage arrangement including an operative pivotal connection between a pair of spaced straps and a lever disposed therebetween, a device for varying the position of said connection longitudinally of the straps, said device comprising a frame having a pair of longitudinally extending transversely spaced guide bars interconnected adjacent one end by a transversely extending bridge, said bars each having a pair of spaced outwardly extending guide flanges defining a guide slot therebetween, said straps being disposed on opposite sides of said frame in said guide slots, said straps presenting a plurality of pairs of aligned apertures, a headless pin extending through the lever and received in aligned apertures of the bars adjacent the ends of the bars remote from the bridge, a yoke on said bridge having a pair of spaced depending arms disposed outwardly adjacent the respective straps, a pair of pins extending through aligned apertures of the respective bars, yoke arms, and selected apertures of the straps, and a retaining plate secured to said bridge and yoke and operable to prevent the accidental displacement of said pair of pins.

2. In a brake rigging, a pair of brake levers, a pair of straps spaced from each other and having certain corresponding ends pivotally connected to one of said levers, and a connecting device adjustably connecting the straps with the other brake lever, said device comprising a frame, said frame presenting strap guide slots on the outer sides thereof, said other brake lever being pivotally connected to the frame, said straps presenting at opposite corresponding ends pairs of aligned pin holes spaced from each other longitudinally thereof, pin means connecting said opposite strap ends to the frame at a selected pair of said strap pin holes, and a yoke carried by the frame and having arms confining the adjacent ends of the straps, said arms having aligned apertures, said pins means extending into said apertures, said pin means being readily selectively movable from within said frame.

3. In a brake rigging, a brake lever, a pair of straps spaced from each other and presenting at corresponding ends thereof a plurality of aligned pin holes spaced from each other longitudinally of the straps, and a device operable to movably interconnect the lever and the straps, said device comprising a frame having a pair of bars spaced from each other and interconnected adjacent one end thereof, said frame presenting pairs of strap guide slots spaced from each other, said lever being disposed between the bars and pivotally connected thereto, said pivotal connection being disposed entirely within said straps, said frame being disposed between the straps with the straps being received in the guide slots and pivotally connected to the frame at a selected pair of aligned strap pin holes, a yoke mounted on said frame and having arms spaced outwardly of said straps and confining the latter, said last-mentioned pivotal connection interlocking said frame, straps, and yoke, said last-mentioned pivotal connection being readily removable from within said frame and being contained entirely within said device.

4. In a brake rigging having a pair of spaced elements and a pair of spaced parallel straps connected at corresponding ends to one of said elements, a device for adjustably connecting the other element to the opposite ends of the straps, comprising: a frame having a portion disposed between said straps adjacent said opposite ends thereof and pivotally connected to said other element, said portion presenting outwardly facing guide slots slidably receiving said straps, said frame having another portion disposed between the straps and adjustably connectable to the straps to selectively vary the location of the frame and said other element relative to the straps; and yoke means connected to said frame and operable to confine said straps within the respective guide slots.

References Cited in the file of this patent

UNITED STATES PATENTS

| 2,104,787 | Blomberg | Jan. 11, 1938 |
| 2,119,505 | Shaver | May 31, 1938 |